United States Patent
Oh et al.

(10) Patent No.: US 7,433,357 B2
(45) Date of Patent: Oct. 7, 2008

(54) APPARATUS AND METHOD FOR PERFORMING HEADER LOOKUP BASED ON SEQUENTIAL LOOKUP

(75) Inventors: Jintae Oh, Daejeon (KR); Seung Won Shin, Daejeon (KR); Ki Young Kim, Daejeon (KR); Jong Soo Jang, Daejeon (KR); Sung Won Sohn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 701 days.

(21) Appl. No.: 10/993,606

(22) Filed: Nov. 19, 2004

(65) Prior Publication Data
US 2005/0141513 A1    Jun. 30, 2005

(30) Foreign Application Priority Data
Dec. 26, 2003    (KR) .............. 10-2003-0097151

(51) Int. Cl.
*H04L 12/50* (2006.01)
(52) U.S. Cl. ............... 370/392; 370/401
(58) Field of Classification Search .......... None
See application file for complete search history.

(56) References Cited

FOREIGN PATENT DOCUMENTS

KR    1020020081569    10/2002

OTHER PUBLICATIONS

"Reducing Routing Table Size Using Ternary-CAM", H. Liu, 5 pages, Dept. of Electrical Engineering Stanford University, CA.

"A High-Speed Multi-Layer Lookup For Policy Based Packet Classification Using TCAM", B. Choi, et al., Proceedings of the IASTED International Conference Communications Systems and Networks, Sep. 9-12, 2002 Spain, pp. 1-6.

"Reducing Routing Table Size Using Ternary-CAM", H. Liu, 5 pages, Dept. of Electrical Engineering Stanford University, CA, Aug. 22-21, 2001.

*Primary Examiner*—Chau Nguyen
*Assistant Examiner*—Louis Bell
(74) *Attorney, Agent, or Firm*—Blakely, Sokoloff, Taylor & Zafman

(57) ABSTRACT

An apparatus and method for performing packet header lookup based on sequential lookup is provided. A header analyzer separates a header from a packet received via a network and outputs a lookup sequence. A unit lookup unit looks up matching the header combination rules with each field to be analyzed and input from the header analyzer based on the lookup sequence input from the header analyzer and outputs a match signal and a match address. A rule combination memory stores identification information for the header combination rules. A sequence combination memory stores lookup sequence information and sequence combination information. A rule combination unit generates match results based on the match signal input from the unit lookup unit and data read from the rule combination memory and the sequence combination memory.

11 Claims, 4 Drawing Sheets

FIG. 1

ICMP packet header Format

| 0 | | | 15 16 | | | 31 |
|---|---|---|---|---|---|---|
| version | length | 8bit TOS | 16bits total length | | | |
| 16bits identification | | | R | DF | MF | 13bits fragment offset |
| 8bit TTL | | 8bit protocol = 1 | 16bits checksum | | | |
| 32bits source IP address | | | | | | |
| 32bits destination IP address | | | | | | |
| Option (if any) | | | | | | |
| 8bit ICMP Type | | 8bit ICMP Code | 16bits checksum | | | |
| 16bits identification | | | 16bits Sequence number | | | |
| Data | | | | | | |

TCP packet header Format

| 0 | | | 15 16 | | | 31 |
|---|---|---|---|---|---|---|
| version | length | 8bit TOS | 16bits total length | | | |
| 16bits identification | | | R | DF | MF | 13bits fragment offset |
| 8bit TTL | | 8bit protocol = 6 | 16bits checksum | | | |
| 32bits source IP address | | | | | | |
| 32bits destination IP address | | | | | | |
| Option (if any) | | | | | | |
| 16-bits source port number | | | 16-bits destination port number | | | |
| 32-bits sequence number | | | | | | |
| 32-bits acknowledgement number | | | | | | |
| 4-bit Data offset | Reserved (6bits) | URG ACK PSH RST SYN FIN | 16-bits window size | | | |
| 16-bits checksum | | | 16-bits urgent pointer | | | |
| Options (if any) | | | | | | |

UDP packet header Format

| 0 | | | 15 16 | | | 31 |
|---|---|---|---|---|---|---|
| version | length | 8bit TOS | 16bits total length | | | |
| 16bits identification | | | R | DF | MF | 13bits fragment offset |
| 8bit TTL | | 8bit protocol = 17 | 16bits checksum | | | |
| 32bits source IP address | | | | | | |
| 32bits destination IP address | | | | | | |
| Option (if any) | | | | | | |
| 16-bits source port number | | | 16-bits destination port number | | | |
| 16-bits UDP length | | | 16-bits UDP checksum | | | |

FIG. 3

| sequences | fields |
|---|---|
| 0x00 | Total length |
| 0x01 | IP Identification |
| 0x02 | IP Fragment |
| 0x03 | IP checksum |
| 0x04 | TCP, UDP source port number |
| 0x05 | TCP, UDP destination port number |
| 0x06 | TCP Windows size |
| 0x07 | TCP checksum |
| 0x08 | TCP Urgent Pointer |
| 0x09 | UDP length |
| 0x0a | UDP Checksum |
| 0x0b | ICMP Checksum |
| 0x0c | ICMP Identification |
| 0x0d | ICMP Sequence number |
| 0x0e~0x0f | Reserved |
| 0x10 | TOS |
| 0x11 | TTL |
| 0x12 | Protocol |
| 0x13 | ICMP type |
| 0x14 | ICMP code |
| 0x15 | TCP Flag |
| 0x16~0x17 | Reserved |
| 0x18 | Source IP |
| 0x19 | Destination IP |
| 0x1a | TCP Sequence number |
| 0x1b | TCP Acknowledgement number |
| 0x1c | IP Header Options |
| 0x1d | TCP Header Options |
| 0x1e~0x1f | Reserved |

APPARATUS AND METHOD FOR PERFORMING HEADER LOOKUP BASED ON SEQUENTIAL LOOKUP

BACKGROUND OF THE INVENTION

This application claims the priority of Korean Patent Application No. 2003-97151, filed on Dec. 26, 2003, in the Korean Intellectual Property Office, the disclosure of which is incorporated herein in its entirety by reference.

1. Field of the Invention

The present invention relates to an apparatus and method for performing packet header lookup based on sequential lookup, and more particularly, to an apparatus and method for performing packet header lookup based on sequential lookup, which is used in a security system such as an intrusion detection system (IDS).

2. Description of the Related Art

A device like a firewall that examines a packet received via a network to protect both network and application attacks, or an intrusion detection system (IDS) examines the combination of a header and a payload of the packet to check whether the packet is abnormal or not. Contrary to the examination of the payload of the packet, in order to examine the header of the packet, each field having a designated location of the header should be examined using various combinations of the header and the payload of the packet. In addition, there is the case where 1-bit is compared with each other in the field of the header. Thus, each bit should be treated as a don't care. In the case of a TCP packet having the size of the header greater than 40 bytes, rules comprised of various combinations of the header and the payload of the packet in data of the header should be compared with one another at the same time.

Meanwhile, the IDS makes various intrusion detection rules using combination obtained from the header of the packet and string information of the payload of the packet. In the case of the intrusion detection rules, there are a plurality of rules comprised of header fields having the same combination and comprised of different strings in the payload. For example, in the case of an Http rule of the intrusion detection rules, several hundreds of rules comprised of a header combination in which the number of a destination port is 80 and comprised of different contents, exist in a TCP protocol. There are several thousands of rules in the IDS. However, there are several hundreds of combinations of header information of the packet in the IDS. Thus, the number of the combinations is not larger than the number of the rules. In addition, these rules should show comparison results of only 1-bit of a specific portion of the header.

In order to solve this complexity, in prior arts, a rule constituting the header is hard-coded using hardware logic. However, there is a limitation on hard-coding when a new rule is added to existing rules. Due to this hardware limitation, in prior arts, only restricted fields of header fields of a packet are searched for using a ternary content addressable memory (TCAM). However, in the case of the TCAM, the TCAM having inputs more than 40 bytes should be operated in only a TCP protocol, and most of fields should be treated as a don't care while rules are combined. On these conditions, many fields are not used in the TCAM, and thus the TCAM is a very ineffective solution. In addition, detection rules for an IP option or a TCP option of the TCP protocol exist in the TCAM. Thus, it is difficult to make various combinations using the TCAM. In addition, power consumption is large and a large physical space is needed.

Furthermore, since information about other fields excluding fields used in lookup is disregarded, correct lookup results cannot be obtained. When all fields of the header are used to perform lookup, in the case of the TCP protocol, lookup should be performed on fields more than 40 bytes at the same time. Thus, so much hardware is needed to constitute an entry. In addition, in general, the number of fields constituting a rule is not large, and thus, so much hardware is needed to constitute an entry. Furthermore, the meaning of fields constituting the header and the size of the header vary according to types of packets. Thus, different lookup entries should be designated in advance in accordance with types of protocols. Furthermore, there is a limitation on the addition of a new rule to existing rules.

SUMMARY OF THE INVENTION

The present invention provides an apparatus and method for performing packet header lookup based on sequential lookup, in which hardware is effectively used and rule combinations are made completely in a rule comprised of an IP option or a TCP option.

According to an aspect of the present invention, there is provided an apparatus for performing packet header lookup based on sequential lookup, the apparatus comprising: a header analyzer separating a header from a packet received via a network and outputting a lookup sequence about a field to be analyzed and having predetermined values of the separated fields and a field included in one or more header combination rules; a unit lookup unit looking up matching the header combination rules with each field to be analyzed and input from the header analyzer based on the lookup sequence input from the header analyzer and outputting a match signal and a match address; a rule combination memory storing identification information for the header combination rules which use entries corresponding to the fields to be analyzed and reading out the identification information from a storage address corresponding to the match address input from the unit lookup; a sequence combination memory storing lookup sequence information designated on fields constituting the packet header and sequence combination information that is information of lookup results for the field to which each header combination rule should refer and reading out read out sequence combination information to which the sequence combination information refer by using the sequence information assigned to entries contained in the fields to be analyzed as an input address; and a rule combination unit generating match results based on the match signal, identification information input from the rule combination memory, and sequence combination information input from the sequence information memory.

According to another aspect of the present invention, there is provided a method of performing packet header lookup based on sequential lookup, the method comprising: storing identification information for the header combination rules which use entries corresponding to the fields to be analyzed in a rule combination memory; storing lookup sequence information designated on fields constituting the packet header and sequence combination information that is information of lookup results for the field to which each header combination rule should refer in a sequence combination memory; separating a header from a packet received via a network and outputting a lookup sequence about a field to be analyzed and having predetermined values of the separated fields and a field included in one or more header combination rules; looking up matching the header combination rules with each field to be analyzed, based on the lookup sequence and outputting a match signal and a match address; obtaining identification information for the header combination rules from the rule combination memory by using the match address as an input address and obtaining sequence combination information to which the header combination rule should refer from the sequence combination by using sequence information designated on fields constituting the packet header; and generating match results based on the match signal, identification information input from the rule combination memory, and sequence combination information input from the sequence information memory.

Thus, the loss of hardware is minimized, high-speed intrusion detection is performed, and detection rules are updated quickly against various attacks.

BRIEF DESCRIPTION OF THE DRAWINGS

The above aspects and advantages of the present invention will become more apparent by describing in detail exemplary embodiments thereof with reference to the attached drawings in which:

FIG. 1 shows header formats defined in protocols that are widely used in current packet transmission;

FIG. 3 shows an example of a lookup sequence table in which a lookup sequence for fields of the packet header is registered.

DETAILED DESCRIPTION OF THE INVENTION

Hereinafter, exemplary embodiments of the present invention will be described in detail with reference to the accompanying drawings.

FIG. 1 shows header formats defined in protocols that are widely used in current packet transmission. In an apparatus and method for performing packet header lookup based on sequential lookup, a packet received via a network is examined and whether the packet is abnormal or not is checked based on detection rules generated by the combination of fields of a header, as shown in FIG. 1.

Figure 2:
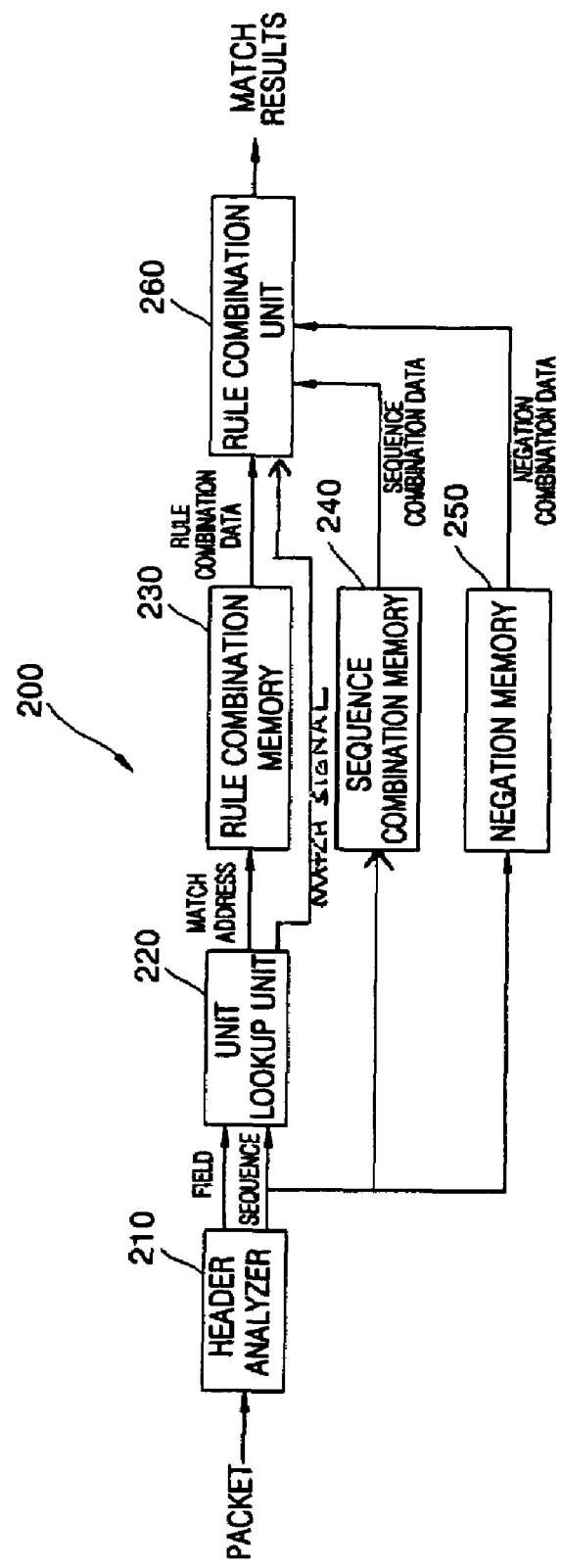
FIG. 2 is a block diagram showing the structure of an apparatus for performing packet header lookup based on sequential lookup according to an embodiment of the present invention.

FIG. 2 is a block diagram showing the structure of an apparatus for performing packet header lookup based on sequential lookup according to an embodiment of the present invention. The apparatus 200 for performing packet header lookup of FIG. 2 includes a header analyzer 210, a unit lookup unit 220, a rule combination memory 230, a sequence combination memory 240, a negation memory 250, and a rule combination unit 260.

The header analyzer 210 separates a header from a packet received via a network and grasps set fields among fields of the header and a lookup sequence. The header analyzer 210 provides the grasped fields and lookup sequence to the unit lookup unit 220 and the lookup sequence to the sequence combination memory 240 or the negation memory 250.

The unit lookup unit 220 looks up matching a header combination rule with each field constituting a packet header based on the fields and the lookup sequence input from the header analyzer 210. The unit lookup unit 220 outputs a match signal and a match address as lookup results to the rule combination unit 260 and the rule combination memory 230, respectively. A field sequence for unit lookup is registered in the unit lookup unit 220. FIG. 3 shows an example of a lookup sequence table in which a lookup sequence for fields of the packet header is registered. The lookup sequence table for an IPv4 protocol may be comprised of fields less than 32. As shown in FIG. 3, when a table is constituted by adding a hexadecimal 0×10 to a field (for example, type of service (TOS) field) constituting the packet header, the unit lookup unit 220 can perform lookup on a corresponding field regardless of other entries recorded in the lookup sequence table. The field sequence registered in the unit lookup unit 220 is selected from entries of the table of FIG. 3. In addition, a ternary content addressable memory (TCAM) may be used as the unit lookup unit 220, and one or more TCAMs having different sizes may be used to lookup fields having different sizes.

The operation of the unit lookup unit 220 will now be described when the unit lookup unit 220 in which a lookup sequence table in which four header combination rules and six entries are recorded is registered has eight entries, for conveniences. Complete detection rules should be formed so that a rule for a header is connected to a rule for a payload. However, the present invention is directed to header lookup and thus, descriptions of payload lookup will be omitted.

The following header combination rules are assumed.
0: TCP, destination port 80, TCP flag syn
1: TCP, destination port 80, TCP ack 0
2: TCP, IP fragment MF
3: UDP, destination port 80

In this case, the following six contents are registered in advance in each entry of the unit lookup unit 220 together with a field sequence number.
0: (0×12, TCP protocol)
1: (0×05, destination port 80)
2: (0×15, TCP Flag syn)
3: (0×1b, TCP ack 0)
4: (0×02, IP fragment MF)
5: (0×12, UDP protocol)

The unit lookup unit 220 looks up a protocol and outputs a match address 0 together with a match signal when TCP is looked up. Next, the unit lookup unit 220 looks up a destination port of the packet and outputs the match signal and a match address 1 when the destination port 80 is looked up. Subsequently, the unit lookup unit 220 looks up on a TCP Flag field etc. in the lookup sequence and outputs the match signal and the match address when a header combination rule is matched with a corresponding field.

The rule combination memory 230 stores identification information for the header combination rules which use entries corresponding to the fields to be analyzed in a storage address corresponding to the match address input from the unit lookup unit 220. Assuming that the apparatus 200 for performing packet header lookup based on sequential lookup makes only four rules, the rule combination memory 230 has a 4-bit output. However, this is defined for explanatory conveniences, and thus there is no limitation on the number of rules provided by the apparatus 200 for performing packet header lookup based on sequential lookup. It is assumed that the sequence of an output bit of the rule combination memory 230 is the same as the sequence of rules.

In this case, the match address output from the unit lookup unit 220 is used as an input address for reading data stored in the rule combination memory 230. For example, information about the TCP protocol is stored in the match address 0 of the unit lookup unit 220. In this case, since the TCP protocol is used commonly in the header combination rules 0, 1, and 2, '1' is recorded in bits 0, 1, and 2 of the match address 0 of the rule combination memory 230, and '0' is recorded in a bit 3 of the match address 0 of the rule combination memory 230. Thus, reading data stored in the match address 0 of the rule combination memory 230 means that match information generated by the unit lookup unit 220 is used in the header combination rules 0, 1, and 2. That is, when '0' is recorded in the bits of the rule combination memory 230, match results of the unit lookup unit 220 are treated as a don't care.

However, when match does not occur in the lookup results of the unit lookup unit 220, the input address of the rule combination memory 230 cannot be obtained. In this case, when a packet received via a network is an ICMP packet, match for the TCP protocol does not occur, the address of the rule combination memory 230 cannot be obtained. Thus, whether the TCP protocol is checked in the header combination rules 0, 1, 2, and 3 cannot be grasped. In this way, unit lookup results needed in all rules cannot be combined only with the output of the rule combination memory 230. Thus, the sequence combination memory 240 is needed together with the rule combination memory 230.

The sequence combination memory 240 stores lookup sequence information designated on fields constituting the packet header and sequence combination information that is information of lookup results for the field to which each header combination rule should refer. To this end, the sequence combination memory 240 needs entries having the same number as the number of fields. Since the IPv4 protocol may be comprised of fields less than 32, the sequence combination memory 240 has 32 entries. In addition, the number of bits of an output data bus of the sequence combination memory 240 should be the same as the number of rules, and the location of each bit represents the number of the rules. For example, a Protocol field is stored in an address 0×12 of the sequence combination memory 240, and all rules use lookup results on the Protocol field, Thus, all of 4 bits should be recorded as '1' (active). In addition, since the TCP Flag field is recorded in an address 0×15 of the sequence combination memory 240 and a rule using the TCP Flag field is the rule '0', the bit 0 is recorded as '1' (active) in an entry 0×15 and the other bits are recorded as '0' (inactive) in the entry 0×15.

The negation memory 250 performs substantially the same operation as that of the sequence combination memory 250 excluding that the case where match does not occur is regarded as a truth. Using the negation memory 250 having the same size as that of the sequence combination memory 240, conditions on that match does not occur in unit lookup results can be used in making combinations. The negation memory 250 may be used when a header combination rule such as TCP, destination port 80, TCP flag syn are used in making a combination. In this case, there is a difference between the header combination rule and the rule 0 in that the case where a syn bit is not active is used as a rule. In this case, '1' is recorded in an address 0×15 of the negation memory 250. Meanwhile, when the negation memory 250 is used, a circuit that recognizes the case where match does not occur in unit lookup as a truth should be added.

The rule combination unit 260 generates match results on the basis of the identification information of header combination rule read from the rule combination memory 230 and sequence combination information that is information of lookup results for fields to which the header combination rule read from the sequence combination memory 240 should refer. Here, the match signal and the match address input from the unit lookup unit 220 are used as an input address to read out the header combination rule from the rule combination memory 230 and the sequence information assigned to entries contained in the fields to be analyzed is used as an input address to read out the header combination rule from the sequence combination memory 240. When the negation memory 250 is used, the rule combination unit 260 uses negation combination data input from the negation memory 250 in forming match results.

Figure 4:
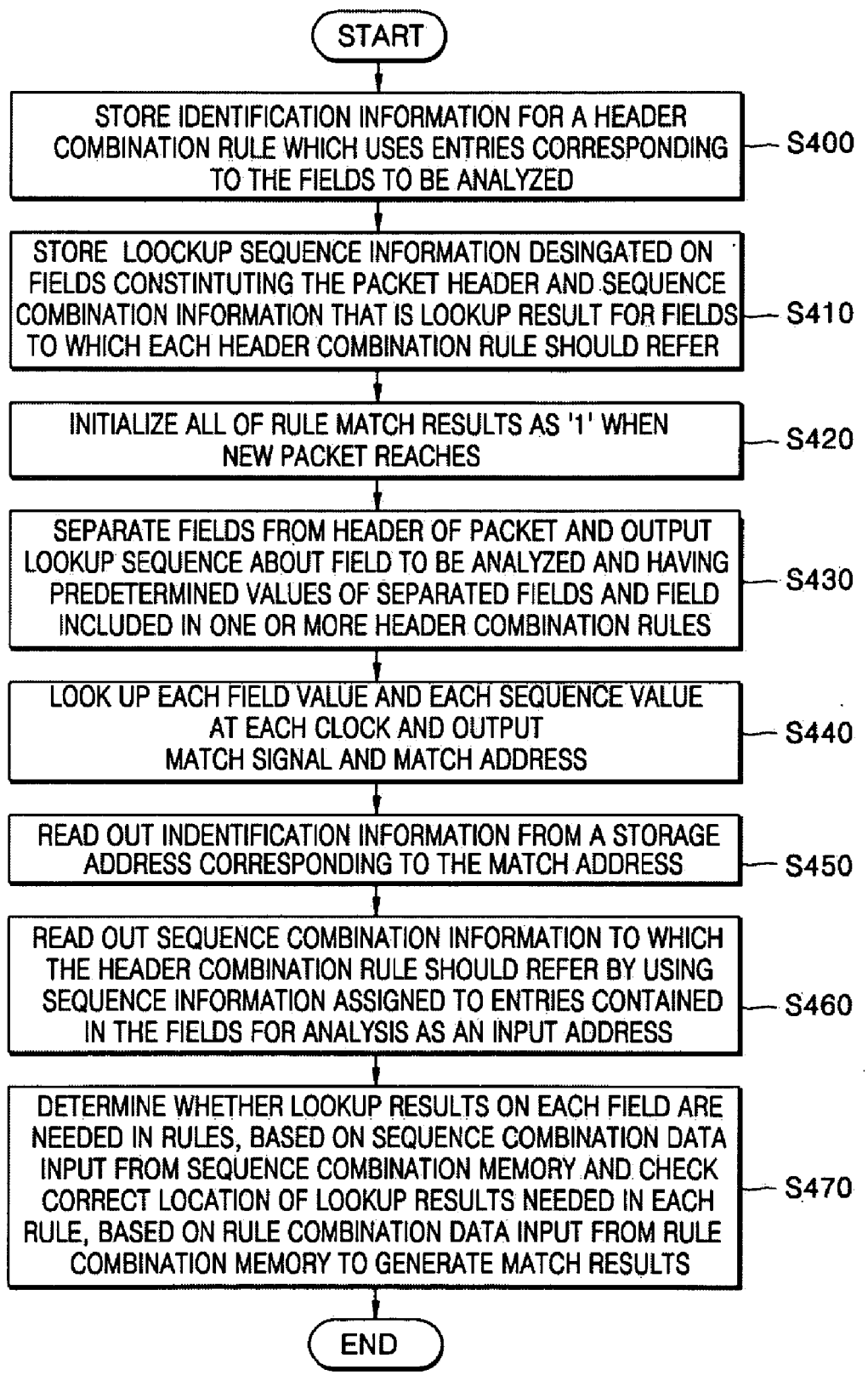
FIG. 4 is a flowchart showing a method of performing packet header lookup based on sequential lookup according to an embodiment of the present invention.

FIG. 4 is a flowchart showing a method of performing packet header lookup based on sequential lookup according to an embodiment of the present invention.

The identification information for the header combination rule which uses entries corresponding to the fields to be analyzed is stored in the rule combination memory 230 in operation S400, and lookup sequence information designated on fields constituting the packet header and sequence combination information that is information of lookup results for fields to which each header combination rule should refer in operation S410. In operation S420, when a new packet reaches the rule combination unit 260, the rule combination unit 260 sets all of rule match results to '1' and waits. Next, in operation S430, the header analyzer 210 separates fields from a header of the packet and outputs a lookup sequence about a field to be analyzed and having predetermined values of the separated fields and a field included in one or more header combination rules to the unit lookup unit 220. In operation S440, the unit lookup unit 220 looks up each field value and each sequence value at each clock and outputs a match signal and a match address as lookup results to the rule combination unit 260 and the rule combination memory 230, respectively.

In operation S450, the rule combination memory 230 reads out identification information from a storage address corresponding to the match address input from the unit lookup unit 220. In operation S460, the sequence combination memory 240 reads out sequence combination information to which each header combination rule should refer by using sequence information assigned to entries contained in the fields to be analyzed as an input address. In operation S470, the rule combination unit 260 determines whether lookup results on each field are needed in rules, based on sequence combination data input from the sequence combination memory 240 and checks the correct location of the lookup results needed in each rule, based on rule combination data input from the rule combination memory 240 to generate match results. In this case, when field lookup needed to synthesize the rules in the sequence combination memory 240 is active and a corresponding bit of resultant bits of the rule combination memory 230 based on unit lookup is inactive, the rule combination unit 260 outputs that a match signal for the rule is reset and mismatched.

The apparatus and method for performing packet header lookup based on sequential lookup according to the present invention will now be described in detail when a header combination rule such as TCP, destination port 80, TCP flag syn is set in a packet received via a network.

First, the unit lookup unit 220 generates a match address '0' together with match results based on unit lookup for a protocol. The rule combination memory 230 uses the match address '0' input from the unit lookup unit 220 as a storage address. Since of the above-described four header combination rules, rules in which a protocol is designated as TCP are rules 0, 1, and 2, '0111' is recorded in an address 0 of the rule combination memory 230. The rule combination unit 260 obtains '0111' by reading data from the address 0 of the rule combination memory 230. Meanwhile, the sequence combination memory 240 uses hexadecimal sequence information allocated to each field registered with a field sequence number as a storage address. The rule combination unit 260 obtains '0111' by reading data from an address 0×12 of the sequence combination memory 240. Thus, the rule combination unit 260 represents that the match results based on unit lookup for the protocol are '0111' and the header combination rules 0, 1, and 2 are matched by lookup upto the protocol.

Next, the unit lookup unit 220 looks up an IP fragment field, and unit lookup results are '0'. Thus, data cannot be read from the rule combination memory 230. However, '0100' can be read from an address 0×02 of the sequence combination memory 240, and a rule using the lookup results of the IP fragment field is the rule 2. However, since mismatch occurs in unit lookup results, the rule combination unit 260 updates lookup results as '0011' in consideration of mismatch based on the rule 2 from '0111' as current lookup results. Thus, after the IP fragment field is looked up, match occurs only in the rules 0 and 1.

Next, the unit lookup unit 220 looks up a destination port and outputs '1' as unit lookup results together with a match signal. In this case, '1011' which is match results on the header combination rules 0, 1, and 3 including a TCP destination port, is recorded in an address 1 of the rule combination memory 230. The rule combination unit 260 reads '1011' from the address 1 of the rule combination memory 230. Meanwhile, since a data storage address of the sequence combination memory 240 on the destination port is 0×05, the rule combination unit 260 obtains '1011' by reading data from an address 0×05 of the sequence combination memory 240. However, since the current lookup results are '0011', the rule combination unit 260 performs a logic operation on the current lookup results and read data and updates the lookup results as '0011'. Thus, the rules 0 and 1 are matched in the lookup results upto the destination port.

Next, the unit lookup unit 220 looks up a TCP Flag field. In this case, when a device such as a TCAM that performs don't care treatment is used, the unit lookup unit 220 outputs '2' as a match address together with a match signal when only a portion syn of the TCP Flag field is set. '0001' as match results on the header combination rule 0 including the TCP Flag field is recorded in the address 2 of the rule combination memory 230. The rule combination unit 260 reads '0001' from the address 2 of the rule combination memory 230. Since the data storage address of the sequence combination memory 240 on the TCP Flag field is 0×15, the rule combination unit 260 obtains '0001' by reading data from the address 0×15 of the sequence combination memory 240. Subsequently, the rule combination unit 260 updates the current match results. In this case, since the data read from the sequence combination memory 240 is '0001', only a bit 0 of the current match results '0011' is updated. However, since the rule 1 does not use the results of the TCP Flag field, it is regarded that the rule 1 is inactive in the output of the sequence combination memory 240. Thus, the rule combination unit 260 treats the match results as a don't care when updating the match results, and the match results are maintained as '0011'.

Next, the unit lookup unit 220 looks up a TCP ack field. Mismatch occurs in the TCP ack field. The rule combination unit 260 reads '0100' from 0×1b which is the data storage address of the TCP ack field of the sequence combination memory 240. That is, in the case of the TCP ack field, it is recorded in the sequence combination memory 240 that the header combination rule 1 is used. However, unit lookup results are in a mismatch state. Thus, the rule combination unit 260 updates the match results as '0001' in consideration of the mismatch based on the rule 1 from '0011' which is the current match results. After lookup of all header fields is terminated, the rule combination unit 260 outputs '0001' as match results. This represents that the rule 0 among the header combination rules is matched with the packet received via the network.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, in the apparatus and method for performing packet header lookup based on sequential lookup according to the present invention, all information about a header of a packet can be combined using hardware. In addition, the present invention can be applied to a high-speed lookup device, and rules can be combined from all information of the header when the present invention is applied to a packet header lookup device having complex and various combinations. In addition, the present invention can add or delete a new rule during operation and provide an effective plan of using hardware. In addition, the present invention can provide high-speed hardware that performs lookup on complex rules needed in a security system such as an intrusion detection system (IDS) and reduce the number of circuits when implementing hardware, and thus, it is easy to implement hardware as a chip.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. An apparatus for performing packet header lookup based on sequential lookup, the apparatus comprising:
    a header analyzer separating a header from a packet received via a network and outputting a lookup sequence about a field to be analyzed and having predetermined values of separated fields and a field included in one or more header combination rules;
    a unit lookup unit looking up matching the header combination rules with each field to be analyzed and input from the header analyzer based on the lookup sequence input from the header analyzer and outputting a match signal and a match address;
    a rule combination memory storing identification information for the header combination rules which use entries corresponding to the fields to be analyzed and reading out the identification information from a storage address which corresponds to the match address input from the unit lookup unit;
    a sequence combination memory storing lookup sequence information designated on fields constituting the packet header and sequence combination information that is information of lookup results for the field to which each header combination rule should refer and reading out read out sequence combination information to which the sequence combination information refer by using the sequence information assigned to entries contained in the fields to be analyzed as an input address; and
    a rule combination unit generating match results based on the match signal, identification information input from the rule combination memory, and sequence combination information input from the sequence information memory.

2. The apparatus of claim 1, further comprising:
a negation memory in which lookup sequence information designated on fields constituting a packet header and lookup results corresponding to the lookup sequence information and set as a truth in a case where mismatch occurs; and
a logic circuit recognizing a case where the lookup results are mismatch as a truth.

3. The apparatus of claim 1, wherein the unit lookup unit is comprised of one or more ternary contents addressable memories (TCAMs).

4. The apparatus of claim 1, wherein the rule combination unit initializes a value on the match results when the packet is received via the network.

5. The apparatus of claim 1, wherein the rule combination unit sequentially performs a logic operation on lookup results on each of the fields to be analyzed, based on the lookup sequence and the header combination rules and updates a value of the lookup results.

6. The apparatus of claim 1, wherein the rule combination unit outputs a value corresponding to mismatch as match results on a corresponding bit when data representing match occurs is recorded in a bit of the sequence combination memory corresponding to a bit in which data representing match does not occur is registered, among bits constituting lookup results read from the rule combination memory.

7. A method of performing packet header lookup based on sequential lookup, the method comprising:
storing identification information for header combination rules which use entries corresponding to the fields to be analyzed in a rule combination memory;
storing lookup sequence information designated on fields constituting packet header and sequence combination information that is information of lookup results for the field to which each header combination rule should refer in a sequence combination memory;
separating a header from a packet received via a network and outputting a lookup sequence about a field to be analyzed and having predetermined values of separated fields and a field included in one or more header combination rules;
looking up matching the header combination rules with each field to be analyzed, based on the lookup sequence and outputting a match signal and a match address;
obtaining identification information for the header combination rules from the rule combination memory by using the match address as an input address and obtaining sequence combination information to which the header combination rule should refer from the sequence combination by using sequence information designated on fields constituting the packet header; and
generating match results based on the match signal, identification information input from the rule combination memory, and sequence combination information input from the sequence information memory.

8. The method of claim 7, further comprising:
storing lookup sequence information designated on fields constituting a packet header and lookup results corresponding to the lookup sequence information and set as a truth in a case where mismatch occurs; and
setting a case where the lookup results are mismatch as a truth.

9. The method of claim 7, further comprising initializing a value on the match results when the packet is received via the network.

10. The method of claim 7, wherein the generating of match results is sequentially performing a logic operation on lookup results on each of the fields to be analyzed, based on the lookup sequence and the header combination rules and updating a value of the lookup results.

11. The method of claim 7, wherein the generating of match results is outputting a value corresponding to mismatch as match results on a corresponding bit when data representing match occurs is recorded in a bit of the sequence combination memory corresponding to a bit in which data representing match does not occur is registered, among bits constituting lookup results read from the rule combination memory.

* * * * *